United States Patent Office 2,810,541
Patented Oct. 22, 1957

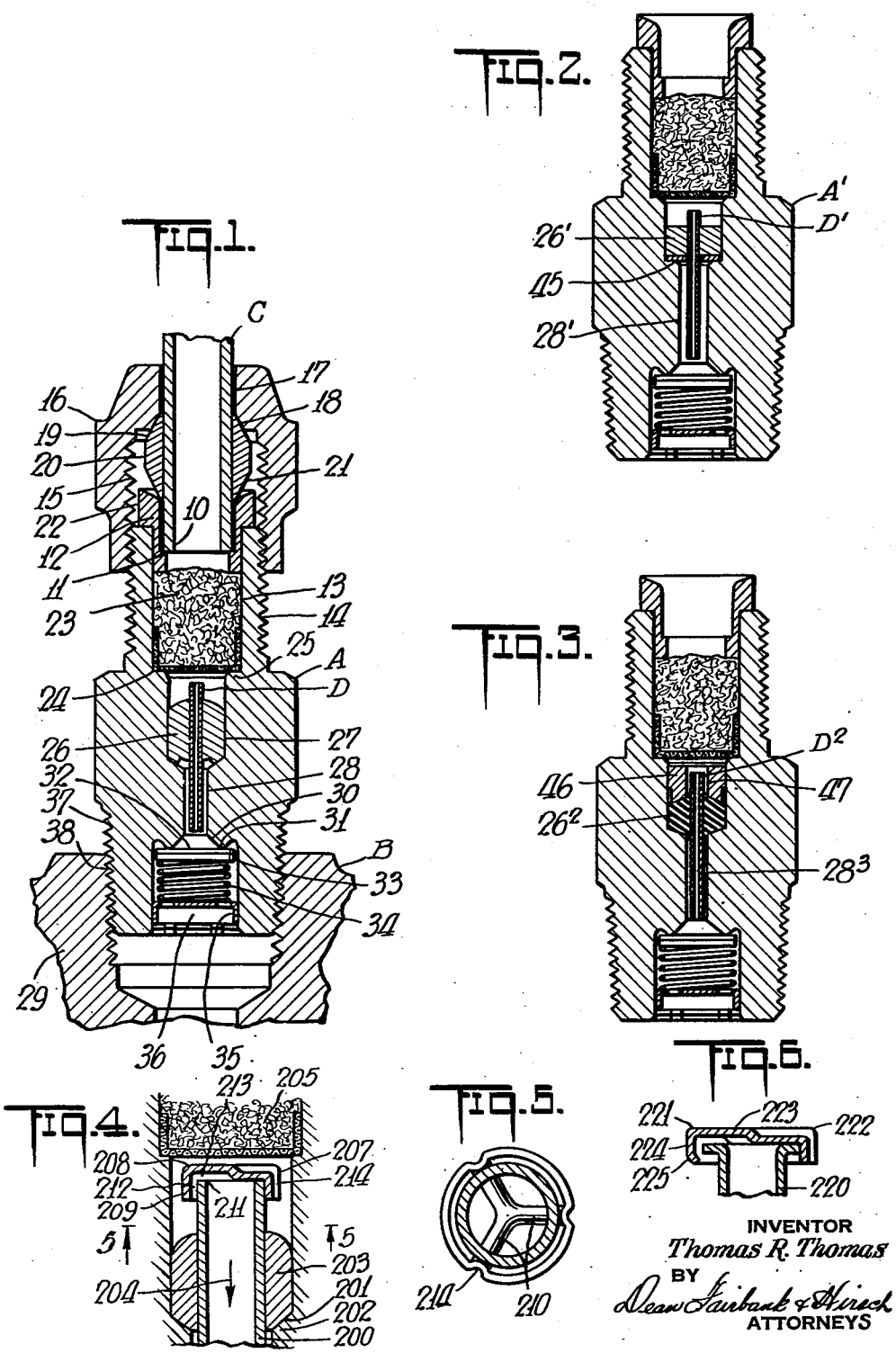

2,810,541

FLOW METERING UNIT

Thomas R. Thomas, New York, N. Y., assignor to Auto Research Corporation, a corporation of Delaware Application July 3, 1951, Serial No. 235,023

1 Claim. (Cl. 251—118)

The present invention relates to a meter unit and it particularly relates to a meter unit to be utilized in connection with the centralized lubricant flow metering distributing system.

It is among the objects of the present invention to provide a flow metering unit for a lubricant distributing system which will give accurate, reliable and predetermined flow metering effect regardless of the length of the distributing line between the metering unit and the central pressure source and regardless of the varying restrictions in the bearings to be lubricated.

It is among the objects of the present invention to provide a reliable, simple, durable, maximum production flow metering unit which may be readily manufactured by automatic machinery to a high degree of accuracy, and which may be readily adjusted during or after manufacture to give accurate predetermined flow metering or flow distribution effect.

Another object of the present invention is to provide a flow metering unit for use in a high restriction type lubricant distributing system which will assure accurate proportionment of relatively minute quantities of lubricant among a plurality of bearings at different heights and at different distances from a central pressure source, with assurance that an accurate proportionment of lubricant will be attained over long periods of time without likelihood of clogging and regardless of various temperatures and viscosities of the lubricant.

In centralized distributing systems for lubricant of the high restriction type, such as may be used on automobile chassis, textile machinery, machine tools such as lathes and milling machines, baking machinery, business machinery, sewing machines, cloth cutters, printing presses, power presses and the like, it is desirable to provide a central lubricant source such as a reservoir, or a lubricant containing pocket in a machine, which will be provided with a gear pump, or reciprocating pump operated manually at intervals, or automatically from the machine to supply predetermined quantities of lubricant to the various space bearings of the machine during operation.

These machines in general require relatively minute quantities of lubricant per unit operation time but it is important that they be not supplied with excess quantities of lubricant which would drip or flow over on the outside of the machine and serve to collect dust, dirt fibres and the like, and not only lessen the life of the machine but in addition create an unsightly appearance and require excessive cleaning effort.

A centralized high pressure lubricating installation should be of such a type as to supply relatively minute yet accurately proportioned quantities of lubricant to the various spaced bearings of the mechanism in accordance with their needs, and with assurance that this supply will be maintained indefinitely without excess testing, checking or maintenance service.

It is particularly important that the flow metering fittings, which regulate the flow of lubricant to the bearings and which are positioned adjacent to or at the outlets, be reliable in operation over long periods of time without tendency toward clogging since in many instances they are not in accessible position or are embodied internally in the machinery and cannot be readily inspected or removed for maintenance purposes.

It is also important that these fittings proportion the relatively minute quantities of lubricant supply among the bearings and be susceptible to ready adjustment and calibration during the manufacturing operation, which calibration and adjustment will be maintained with assurance after installation and throughout the operation of the machine, although the period often be many years.

It is therefore among the further objects of the present invention to provide such a flow metering unit in the form of a compact, readily manufactured unit, susceptible to being readily installed in small space in or about the bearings of the type of mechanism previously described, and which at the same time may be readily calibrated and regulated during manufacture to give the desired metering effect after assemblage into the flow metering distributing system and upon the mechanism to be lubricated.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most suitable, according to one embodiment of the present invention, to provide a flow metering fitting preferably made out of tubular, square, hexagonal or even octagonal brass bar stock which may be externally provided with various types of machine or pipe threads to enable attachment to bearings or compression coupling connections.

Although the present invention is particularly directed to a threaded end type flow metering fitting, it is also adapted to various types of press-in or plug-in types of flow metering fittings with relatively smooth outside faces to enable lubricant tight connection into recesses into injunction elements or bearing or machine recesses.

A particularly important feature of the present invention resides in the fact that the central portion of the fitting is provided with a central passage having inlet and outlet sockets.

The central passage receives a small diameter tube of varying length, say from 0.2 to 0.4", and of varying internal diameters or flow passages ranging from .002 to .02. This tube is desirably imbedded in a soft lead or plastic or even synthetic rubber washer which is forced into the interior of the fitting in such a manner as to compel all flow to take place through such small diameter tubing.

Desirably, before the small diameter tubing and in the inlet recess of the fitting there is positioned a socket receiving a strainer, while on the outlet side of the fitting in a socket is positioned a spring sealed flat check valve with a plastic facing of vinyl, silicone or fluor-ethylene resins.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:

Fig. 1 is a longitudinal sectional view of one type of flow metering fitting according to the present invention.

Fig. 2 is a longitudinal sectional view similar to Fig. 1 of an alternative form of flow metering fitting.

Fig. 3 is a longitudinal sectional view of still another alternative form of flow metering fitting.

Fig. 4 is a vertical fragmentary transverse sectional view upon an enlarged scale showing a cover device for protecting the inlet side of a tubular restriction as shown in Figs. 1 to 3.

Fig. 5 is a transverse horizontal sectional view upon the line 5—5 of Fig. 4.

Fig. 6 is a fragmentary transverse sectional view upon an enlarged scale of a tubular restriction inlet similar to Fig. 4, but showing a different embodiment.

Referring to Fig. 1 there is shown a fitting body A, a bearing structure B, and the end C of a small distributing tubing system.

The tubing C is connected nearly or remotely to a central pressure pump or source.

The tubing is desirably thin wall tubing and its end 10 abuts a shoulder 11 in the nipple 12. The nipple 12 fits in the outer end of the socket 13 inside of the machine threaded portion 14 of the body A.

The machine threaded portion 14 of the body A receives the tapped socket 15 of the coupling nut 16.

The coupling nut 16 has a central passage 17 through which extend the tubing C.

The interior bottom of the socket of the nut 16 has the camming face 18 which reacts upon the inclined narrow face 19 of the deformable coupling sleeve 20.

The inside tapered edge 21 of the coupling sleeve 20 rests upon the tapered shoulder or recess 22 of the thimble 12.

The inside edge of the thimble 12 holds the strainer 23 in position. The strainer has a metal mesh backing cup 24 which rests in the bottom of the inlet socket as indicated at 25. The tubing D is tightly wedged in the holder member 26 which may be of soft metal or rubber or an oil resistant plastic. If desired, the metal 26 may actually be poured in molten condition into the recess 27. Normally, however, the metal 26 may be formed tightly around the tube D before being forced into the recess 27 without deforming or changing the internal diameter of the tubing D.

The tube D extends a substantial distance below the plug 26 into a central bore 28 in the fitting A. The lower end 29 of the tube should terminate just inside of the countersink 30 above the annular valve ridge 31.

The valve has a plastic face 32 of vinyl resin, silicone resin or even a fluor-ethylene resin. It is also provided with a metal backing plate 33, a coil spring 34 and a spring retainer 35, all held within the outlet socket 36.

The outlet end of the fitting A is provided with a pipe threading 37 which screws into the pipe threaded socket 38 in the bearing structure B.

The restricting effect of the fitting of Fig. 1 will solely depend upon the length and diameter of the bore of the tube D and the strainer and valve will assist in the distribution effect by preventing entry of dirt particles and by preventing entry of air at higher bearings.

The flow metering fitting unit, as shown in Fig. 1, will be particularly adaptable to functioning over long periods of time without deranging or service, and without the necessity of inspection or replacement even though the machine be operated out of doors or subjected to substantial vibration while operating.

In the unit of Fig. 2, similarly functioning parts are indicated by the same letters and numerals primed as in Fig. 1.

In the unit of Fig. 2 the tube D' has a close fitting washer 26' which may be of an expansive metal of low melting point such is known as cerromatrix. This cerromatrix has a backing plate 45 which will prevent flowing of the molten expansive metal into the tube clearance hold 28'.

In the flow metering unit of Fig. 3, similarly functioning parts are indicated by the same numerals and letters as in Figs. 1 and 2 except provided with a superior "2."

In Fig. 3 there is provided a synthetic rubber plug $26^2$ resistant to oil which is held in place by an annular metal plug 46. It will be noted that both ends of the tube $D^2$ extend into passageways 47 and $28^3$ respectively Although the tube sizes may vary widely, it has been found that a convenient rating system may be made up as follows:

.0051 internal diameter x .00275 wall thickness
.0062 internal diameter x .00275 wall thickness
.0073 internal diameter x .00275 wall thickness
.0087 internal diameter x .004 wall thickness
.011 internal diameter x .005 wall thickness
.0131 internal diameter x .006 wall thickness
.0157 internal diameter x .006 wall thickness Referring to Figs. 5 and 6, the tubular restriction 200 is shown fixed in the central recess 201 of the fitting 202 by the plug 203. The passageway 204 is not only protected by the strainer 205 with the backing cup 206 but also by the cap 207. The cap 207 has a base 208 and a side flange 209.

When placed upon the top of tube 200 the downward projections 210 will contact the top of the tube 211.

This will leave the crevices 212 and 213 for passage of oil into the passageway 204.

This cap 207 will protect the entrance of the tube 200 from felt hairs and from small initial particles.

The cap 207 will give an edge crevice effect giving edge filter protection.

In the alternative construction of Fig. 6 the tube 220 has a flared upper end 221. The cap 222 has the base 223 and the skirt 224.

The skirt 224 has 3 or 4 places as indicated at 225 which are crimped under the flare 221 to prevent loss or dislocation of the cap 222.

Normally the crevices 212 and 213 will be of the order of 0.002 to 0.005 inch.

In Figs. 4 and 5 the indentations 214 enable the cap 207 to be press fitted or push fitted over the top of the tube 200 with assurance that there will be close contact at the position of the three or four indentations 214.

As many changes could be made in the above lubrication, and many widely different embodiments of this invention could be made without departing from the scope of the claim, it is intended that all matter contained in the above description shall be interpreted as illustrative and not in a limiting sense.

Having now particularly described and ascertained the nature of the invention, and in what manner the same is to be performed, what is claimed is:

A high restriction liquid metering unit to control the flow of lubricant from the outlet of a branched distributing lubrication installation having tubing leading to a bearing, an elongated body having a central hexagonal cross section and exteriorly threaded inlet and outlet ends and a through passage extending longitudinally through the full length and along the axis thereof having a central socket recess and inlet and outlet end socket recesses, the inlet socket recess being provided with a strainer and the outlet socket recess being provided with a check valve, a small diameter capillary tube extending longitudinally in said through passage along the axis thereof and a soft metal plug encircling the intermediate portion of the tube and jammed against the side walls and bottom of the central recess so that all flow must pass through said tube and said tube having a cap over the inlet end thereof with passages to permit flow of lubricant under the cap into the tube.

References Cited in the file of this patent

UNITED STATES PATENTS

| | | |
|---|---|---|
| 706,781 | Reynolds | Aug. 12, 1902 |
| 1,404,724 | Allen | Jan. 31, 1922 |
| 1,490,291 | Ross | Apr. 15, 1924 |
| 1,526,655 | Allen | Feb. 17, 1925 |
| 1,632,771 | Bijur | June 14, 1927 |
| 1,714,373 | Johnson | May 21, 1929 |
| 1,948,503 | Bijur | Feb. 27, 1934 |
| 2,367,158 | Ulm | Jan. 9, 1945 |